(12) United States Patent
Cochrane et al.

(10) Patent No.: US 7,999,922 B1
(45) Date of Patent: Aug. 16, 2011

(54) COHERENT IMAGING SYSTEM AND METHOD FOR PRODUCING HIGH RESOLUTION IMAGES

(75) Inventors: Andrew T. Cochrane, Livermore, CA (US); Raymond Mack Bell, Jr., Redwood City, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 294 days.

(21) Appl. No.: 12/431,700

(22) Filed: Apr. 28, 2009

Related U.S. Application Data

(60) Provisional application No. 61/054,790, filed on May 20, 2008.

(51) Int. Cl.
 *G01C 3/08* (2006.01)
(52) U.S. Cl. ............... 356/4.01; 356/3.01; 356/3.15; 356/4.1; 356/5.01; 356/5.1
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | | |
|---|---|---|---|---|
| 7,405,834 B1 * | 7/2008 | Marron et al. | ................. | 356/521 |
| 2009/0147004 A1 * | 6/2009 | Ramon et al. | ................. | 345/428 |

OTHER PUBLICATIONS

Marron et al., "Distributed Aperature Active Imaging," Laser Radar Technology and Applications XII, 2007, 65500A-1 through 65500A-7, vol. 6550, Proc. of SPIE, Orlando, Florida, USA.
Marron et al., "Holographic Laser Radar," Optic Letters, Mar. 1, 1993, pp. 385-387, vol. 18, No. 5, Optical Society of America, Orlando, Florida, USA.

* cited by examiner

*Primary Examiner* — Thomas H Tarcza
*Assistant Examiner* — Luke D Ratcliffe
(74) *Attorney, Agent, or Firm* — McDermott Will & Emery LLP

(57) ABSTRACT

A coherent imaging system for producing high resolution images is provided. A coherent radiation source module produces two radiation beams, each at a different instance. An optical component directs the first radiation beam towards a target at a first angle to produce a first return beam, and also produces a first reference beam. Another optical component directs the second radiation beam towards the target at a second angle to produce a second return beam, and also produces a second reference beam. An aperture collects the first return beam and the second return beam. A detector module produces two coherent images based on interference between the return beams and the reference beams. The detector module also combines the first coherent image and the second coherent image to produce a high resolution coherent image, which has a resolution higher than a resolution of the first coherent image or the second coherent image.

20 Claims, 7 Drawing Sheets

COHERENT IMAGING SYSTEM AND METHOD FOR PRODUCING HIGH RESOLUTION IMAGES

CROSS-REFERENCES TO RELATED APPLICATIONS

The present application claims the benefit of U.S. Provisional Patent Application Ser. No. 61/054,790, entitled "Multiple Laser Distributed Active Imaging," filed on May 20, 2008, which is hereby incorporated by reference in its entirety for all purposes. This application is related to U.S. Pat. No. 7,405,834, entitled "Compensated Coherent Imaging for Improved Imaging and Directed Energy Weapons Applications," filed on Feb. 15, 2006, which is hereby incorporated by reference in its entirety for all purposes. This application is also related to U.S. patent application Ser. No. 11/878,367 entitled "Systems and Methods for Multi-Function Coherent Imaging," filed on Jul. 24, 2007, which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The subject technology generally relates to imaging and, in particular, relates to coherent imaging systems and methods for producing high resolution images.

BACKGROUND

In the field of laser remote sensing and imaging, an object is typically radiated with a laser source, and the reflected light intensity is measured to determine the characteristics of the object. Typically, the object is spatially scanned with a narrow laser beam, and the intensity of the reflected beam is measured as a function of beam location. Alternatively, the object can be flood illuminated with laser light and the image can be recorded by using a detector array with a conventional lens in a manner analogous to flash photography.

SUMMARY

According to one aspect of the disclosure, an array of lasers may be used to illuminate a target, and a single telescope may be used to collect the return speckle field. According to another aspect of the disclosure, the image from each laser can be digitally combined to create a synthetic pupil that will produce a high resolution coherent image.

In accordance with aspect of the subject technology, a coherent imaging system for producing high resolution images is provided. The coherent imaging system comprises a coherent radiation source module configured to produce a first radiation beam at a first instance and a second radiation beam at a second instance. The second instance is different in time from the first instance. The coherent imaging system also comprises a first optical component configured to direct the first radiation beam towards a target at a first angle to produce a first return beam. The first optical component is also configured to produce a first reference beam. The coherent imaging system also comprises a second optical component configured to direct the second radiation beam towards the target at a second angle to produce a second return beam. The second optical component is also configured to produce a second reference beam. The second angle is different from the first angle. The coherent imaging system also comprises an aperture configured to collect the first return beam and the second return beam.

The coherent imaging system also comprises a detector module configured to produce a first coherent image based on interference between the first return beam and the first reference beam. The detector module is also configured to produce a second coherent image based on interference between the second return beam and the second reference beam. The detector module is also configured to combine the first coherent image and the second coherent image to produce a high resolution coherent image. The high resolution coherent image has a resolution higher than a resolution of the first coherent image or the second coherent image.

In accordance with another aspect of the subject technology, a coherent imaging system for producing high resolution images is provided. The coherent imaging system comprises a coherent radiation source module configured to produce a first radiation beam and a second radiation beam. The coherent imaging system also comprises an optical component configured to direct the first radiation beam towards a target at a first angle to produce a first return beam. The optical component is also configured to produce a first reference beam. The optical component is also configured to direct the second radiation beam towards the target at a second angle to produce a second return beam. The optical component is also configured to produce a second reference beam. The coherent imaging system also comprises an aperture configured to collect the first return beam and the second return beam.

The coherent imaging system also comprises a detector module configured to produce a first coherent image based on interference between the first return beam and the first reference beam. The detector module is also configured to produce a second coherent image based on interference between the second return beam and the second reference beam. The detector module is also configured to combine the first coherent image and the second coherent image to produce a high resolution coherent image. The high resolution coherent image has a resolution higher than a resolution of the first coherent image or the second coherent image.

According to another aspect of the subject technology, a method for producing high resolution images is provided. The method comprises directing a first radiation beam towards a target at a first angle to produce a first return beam. The method also comprises collecting the first return beam at an aperture. The method also comprises producing a first coherent image based on interference between the first return beam and a first reference beam. The method also comprises directing a second radiation beam towards the target at a second angle to produce a second return beam. The second angle is different from the first angle. The method also comprises collecting the second return beam at the aperture. The method also comprises producing a second coherent image based on interference between the second return beam and a second reference beam. The method also comprises combining the first coherent image and the second coherent image to produce a high resolution coherent image. The high resolution coherent image has a resolution higher than a resolution of the first coherent image or the second coherent image.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

DETAILED DESCRIPTION

In the following detailed description, numerous specific details are set forth to provide a full understanding of the subject technology. It will be obvious, however, to one ordinarily skilled in the art that the subject technology may be practiced without some of these specific details. In other instances, well-known structures and techniques have not been shown in detail so as not to obscure the subject technology. Like components are labeled with similar element numbers for ease of understanding.

Figure 1B:
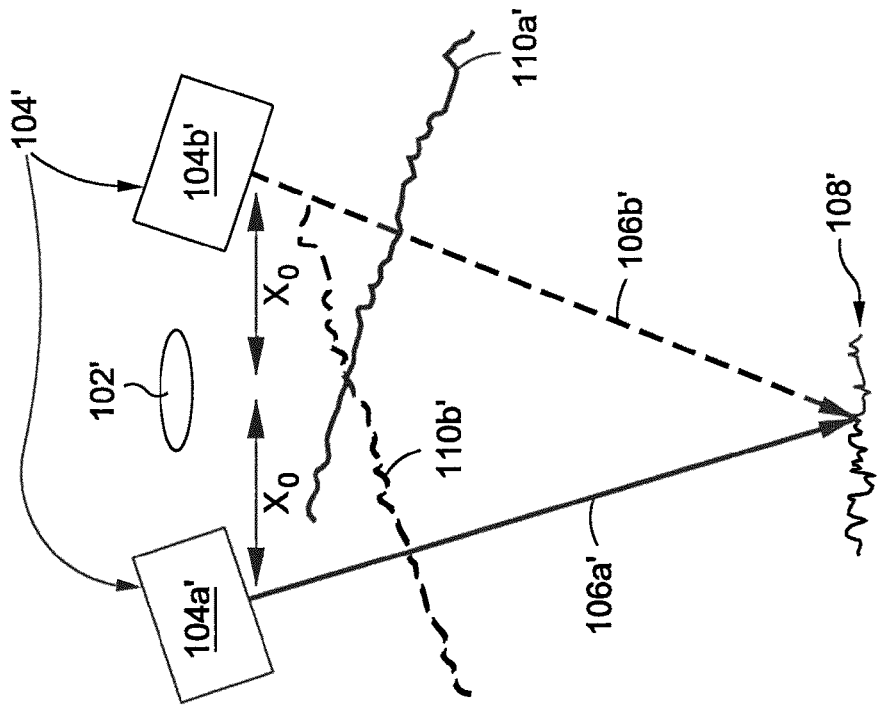
FIG. 1B illustrates an example of a configuration for a coherent imaging system, in accordance with one aspect of the subject technology.
Figure 1A:
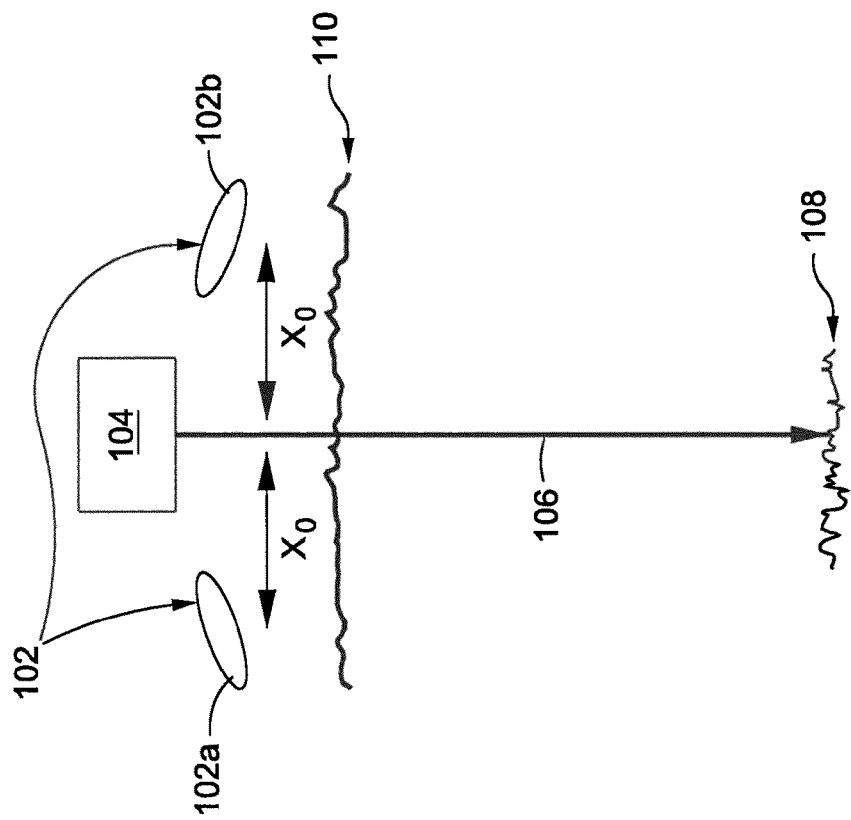
FIG. 1A illustrates an example of a distributed aperture active imaging system, according to one approach.

FIG. 1A illustrates an example of a distributed aperture active imaging system according to one approach.

According to one approach, a distributed aperture active imaging system, which may also be referred to as a multiple aperture active imaging system, combines the high resolution value of multiple aperture imaging with the unique remote sensing value of coherent imagery. For example, distributed aperture technology can be combined with active imaging technology to create high resolution coherent imagery. In a distributed aperture active imaging system, a single coherent radiation source (i.e., a laser) illuminates a target with a radiation beam, and an array of individual apertures, also called "sub-apertures," captures the return beam from the target (i.e., the reflected signal or return speckle field). The individual apertures, or sub-apertures, may be telescopes. The return beam may be interfered or mixed with a reference beam, such as a local oscillator, to create an interference pattern. The distributed aperture active imaging system may collect coherent imagery by recording this interference pattern. The process may result in a Fourier transform pair comprising a coherent image of the pupil and a coherent image of the target. The pupil image may comprise images from several sub-apertures that, when digitally combined, produce an image with resolution corresponding to a pupil that is larger than the individual sub-apertures (i.e., a synthetic aperture image). Thus, multiple aperture coherent images may be collected using a single coherent radiation source and multiple apertures, according to one approach.

The coherent radiation source 104 and collecting sub-apertures 102 of a distributed aperture active imaging system are shown in FIG. 1A. For example, coherent radiation source 104 may be a single laser transmitter which produces a radiation beam 106, such as a single transmitted laser beam. Radiation beam 106 may reflect from the surface of target 108 to produce return beam 110. As shown in FIG. 1A, target 108 may be a target with a rough surface. Return beam 110 may be the reflected speckle field. Sub-apertures 102a and 102b may collect return beam 110. The collected return beam 110 from each sub-aperture 102a and 102b may be mixed with a reference beam (not shown), and the result may be a coherent image of the speckle field. The Fourier transform of the combined speckle field of all of sub-apertures 102 may produce the high resolution coherent image.

FIG. 1B illustrates an example of a coherent imaging system, in accordance with one aspect of the subject technology.

In accordance with one aspect of the disclosure, a novel way to implement a distributed aperture active imaging system is provided. In one aspect, the subject technology can provide a cost effective way to collect high resolution coherent imagery. In another aspect, the subject technology is an improved way to collect a synthetic aperture image.

In FIG. 1B, multiple coherent radiation sources are used instead of a single coherent radiation source, and a single aperture is used instead of multiple apertures, in accordance with one aspect of the disclosure. The coherent image from each coherent radiation source can be digitally combined to obtain a high resolution coherent image as if a synthetic pupil, corresponding to multiple sub-apertures, were used to produce the high resolution coherent image. Thus, according to one aspect of the disclosure, the high resolution benefit of a distributed aperture active imaging system can be achieved by using multiple coherent radiation sources and a single aperture to create a synthetic aperture image.

In one aspect, shifting the location of the multiple coherent radiation sources relative to a target causes the return speckle fields to shift. As a result, the receiving aperture images a different region of the speckle field. By using multiple coherent radiation sources to illuminate the target from different angles, the speckled field can be sampled at several locations, in accordance with one aspect of the disclosure. Since the holographic approach provides coherent field data at the pupil, the individual pupil images—each corresponding to a coherent radiation source illuminating the target at a different angle—can be digitally assembled and Fourier transformed to produce a high resolution coherent image.

Referring to FIG. 1B, coherent radiation sources 104a' and 104b' may produce radiation beams 106a' and 106b' to illuminate target 108' at different angles. For example, radiation beam 106a' is directed towards target 108' at a first angle, and radiation beam 106b' is directed towards target 108' at a second angle as shown in FIG. 1B. A single sub-aperture 102' may collect return beams 110a' and 110b', which may be the return speckle fields reflected from target 108'. The images are not necessarily acquired simultaneously. For example, coherent radiation source 104a' may produce radiation beam 106a' at one instance, such as a first instance, while coherent radiation source 104b' may produce radiation beam 106b' at a different instance, such as a second instance, where the second instance is different in time from the first instance. Similarly, sub-aperture 102' may also collect return beams 110a' and 110b' at different times. For example sub-aperture 102' may collect return beam 110a' at one instance and may collect return beam 110b' at a different instance. Similarly, a detector (not shown) may detect or record interference associated with the collected return beams 110a' and 110b' at different times. For example, the detector may detect interference between return beam 110a' and a first reference beam to form a first interferogram at one instance. The detector may also detect interference between return beam 110b' and a second reference beam to form a second interferogram at a different instance.

If the distance between coherent radiation sources 104' and sub-aperture 102' is $X_0$ as shown in FIG. 1B, in the same way that the distance between sub-apertures 102 and coherent radiation source 104 is $X_0$ as shown in FIG. 1A, then the speckle field collected by sub-aperture 102' in FIG. 1B from coherent radiation source 104a' is the same field as that collected by sub-aperture 102a in FIG. 1A, in accordance with one aspect of the disclosure. Similarly, the speckle field collected by sub-aperture 102' in FIG. 1B from coherent radiation source 104b' is the same as that collected by sub-aperture 102b in FIG. 1A, in accordance with another aspect of the disclosure. As a result, the coherent imaging system in FIG. 1B collects the same regions of the return speckle field as that of the distributed aperture active imaging system in FIG. 1A, according to one aspect of the disclosure. Consequently, both systems may produce the same high resolution coherent image, in accordance with one aspect of the disclosure.

According to another aspect of the disclosure, the subject technology is associated with various benefits over a distributed aperture active imaging system. For example, the coherent imaging system of FIG. 1B, which may be referred to as a multiple laser distributed active imaging system, can be appealing because apertures such as telescopes can be replaced with coherent radiation sources such as laser transmitters. Laser transmitters can be lighter, smaller, and cheaper than telescopes. While the subject technology may be suitable for all sensor platforms, this solution may be ideal for space-based sensors according to one aspect.

Coherent imaging has the capability to produce three dimensional images from aircraft and space-based platforms. For both platforms, multiple laser transmitters may offer space and weight savings over multiple apertures. On space based platforms or space-based sensors, the laser transmitters can be stowed during launch, and then deployed on orbit to create a large synthetic pupil. According to one aspect, extremely large synthetic apertures, even in space, are possible with a multiple laser distributed active imaging system. As a result, high resolution coherent imagers can be launched with minimal weight and size. Similar deployment of telescopes may be extremely difficult because of the relatively larger size and weight of the telescopes.

In accordance with one aspect of the disclosure, a spacecraft may comprise the coherent imaging system disclosed herein, such as the coherent imaging system of FIG. 1B. The coherent radiation source may be stowable and deployable in the spacecraft. However, more power may be required due to the fact that multiple laser pulses are used to collect a single image. In accordance with another aspect, the subject technology may be used in advanced sensors markets. In yet another aspect, the subject technology is related to coherent imaging, lasers, multiple apertures, local oscillators, and imaging.

Figure 2:
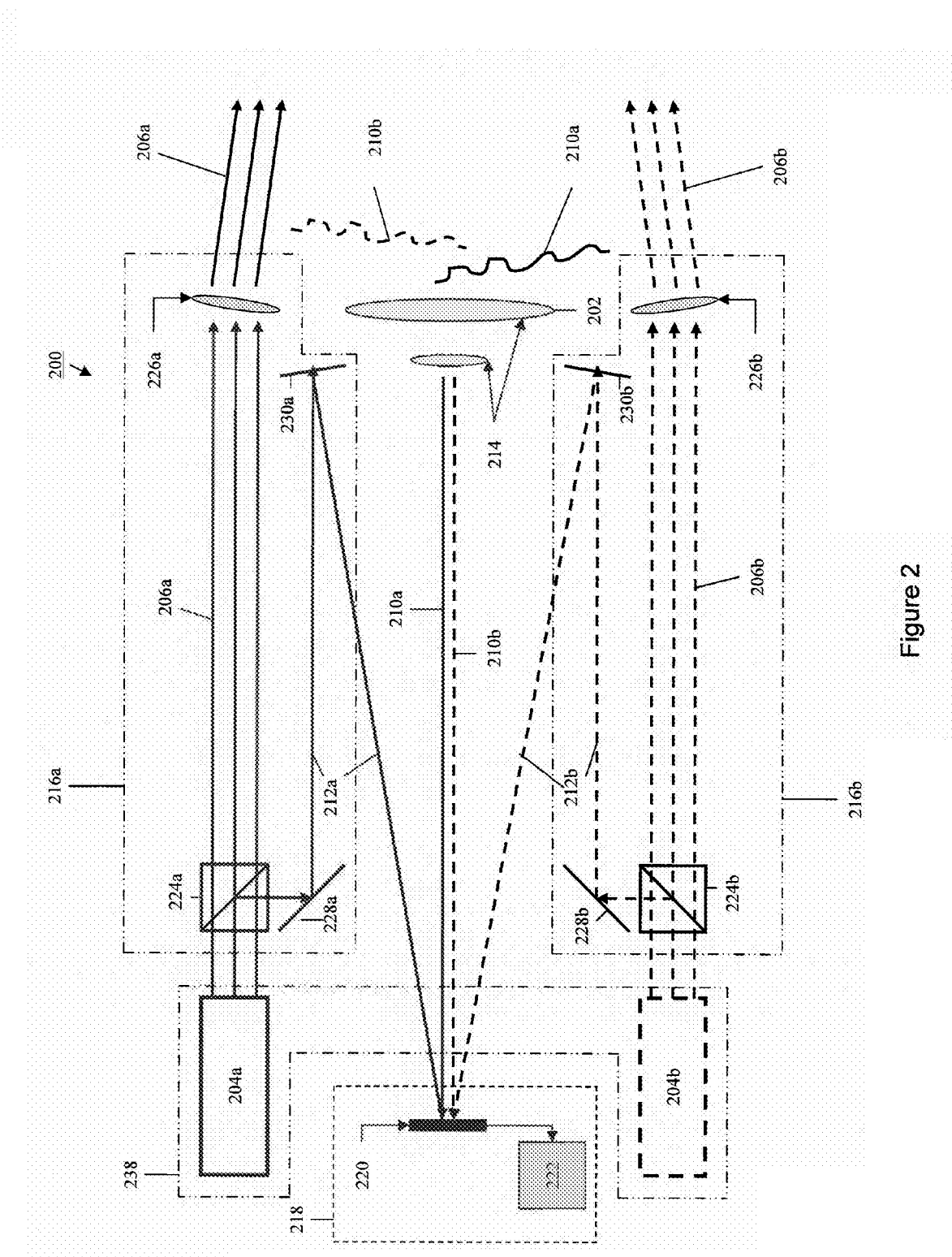
FIG. 2 illustrates an example of a configuration for a coherent imaging system, in accordance with one aspect of the subject technology.

FIG. 2 illustrates an example of a configuration for a coherent imaging system 200, in accordance with one aspect of the subject technology. Coherent images of the pupil may be obtained from different coherent radiation sources in rapid succession. The images may be digitally combined and processed to create a high resolution coherent image.

Coherent radiation source module 238 may comprise coherent radiation sources 204a and 204b. Coherent radiation source 204a may produce first radiation beam 206a to illuminate a target (not shown). First optical component 216a may direct first radiation beam 206a towards the target at a first angle to produce a first return beam 210a. First optical component 216a may also produce first reference beam 212a. First optical component 216a may comprise various optical components such as beamsplitters, beamcombiners, mirrors, polarizers, wave plates, lenses, fiber splitters, or other optical components, which may be utilized in various configurations known to those of skill in the art to route and direct radiation beams. For example, according to one aspect of the disclosure, first optical component 216a may comprise a first beamsplitter 224a configured to direct first radiation beam 206a towards first transmitter 226a, such as a lens or telescope. First transmitter 226a may direct first radiation beam 206a towards the target at the first angle. First mirrors 228a and 230a may direct first reference beam 212a towards detector 220. Detector module 218 may comprise detector 220 and processor 222.

Aperture 202 may capture the return speckle field from the target. For example, aperture 202 may collect first return beam 210a. An optional pupil and beam reduction optics 214 (i.e., beam magnification optics) may be used for afocal magnification. The coherent imaging process may require the pupil to be imaged onto detector 220, and the size of detector 220 may be much smaller than the pupil. As a result, the image of the pupil may be de-magnified. For example, pupil and beam reduction optics 214 may be used for de-magnifying first return beam 210a.

According to one aspect of the disclosure, after first return beam 210a is de-magnified, it is sent to the focal plane of detector 220. For example, first return beam 210a is directed towards detector 220 and interfered or mixed with first reference beam 212a, forming a first inteferogram. The resulting inteferogram may be detected by detector 220. Detector 220 may be a conventional charge-coupled device ("CCD"), a complementary metal-oxide-semiconductor ("CMOS") detector, or any other suitable imaging device. Detector 220 may output the detected signals, such as the first interferogram, to processor 222, where digital processing produces a Fourier transform pair of the field at the target and the pupil, in accordance with one aspect of the disclosure. For example, processor 222 can determine the Fourier transform of the first interferogram to produce a first coherent image.

After collection of the image from coherent radiation source 204a, another image may be captured using coherent radiation source 204b. Coherent radiation source 204b may produce second radiation beam 206b to illuminate the target. Second optical component 216b may direct second radiation beam 206b towards the target at a second angle to produce a second return beam 210b. Second optical component 216b may also produce second reference beam 212b. Second optical component 216b may comprise various optical components such as beamsplitters, beamcombiners, mirrors, polarizers, wave plates, lenses, fiber splitters, or other optical components, which may be utilized in various configurations known to those of skill in the art to route and direct radiation beams. For example, according to one aspect of the disclosure, second optical component 216b may comprise a second beamsplitter 224b configured to direct second radiation beam 206b towards second transmitter 226b, such as a lens or telescope. Second transmitter 226b may direct second radiation beam 206b towards the target at the second angle. Second mirrors 228b and 230b may direct second reference beam 212b towards detector 220.

Aperture 202 may again capture the return speckle field from the target. For example, aperture 202 may collect second return beam 210b. Note that a different region of the speckle field is collected, in accordance with one aspect of the disclosure. Optional pupil and beam reduction optics 214 may be used for afocal magnification. For example, pupil and beam reduction optics 214 may be used for de-magnifying second return beam 210b.

According to one aspect of the disclosure, after second return beam 210b is de-magnified, it is sent to the focal plane of detector 220. For example, second return beam 210b is directed towards detector 220 and interfered or mixed with second reference beam 212b, forming a second inteferogram. The resulting inteferogram may be detected by detector 220. Detector 220 may output the detected signals, such as the second interferogram, to processor 222, where digital processing produces a Fourier transform pair of the field at the target and the pupil, in accordance with one aspect of the disclosure. For example, processor 222 can determine the Fourier transform of the second interferogram to produce a second coherent image.

In one aspect, the resulting second coherent image has the same resolution as the first coherent image. However, if the coherent images of the pupil are digitally reassembled to create an image of a larger distributed aperture pupil, then the resulting Fourier transform performed by processor 222 may produce a high resolution coherent image, where the high resolution coherent image has a resolution higher than a resolution of the first coherent image or the second coherent image. According to one aspect of the disclosure, if the image from each coherent radiation source needs to be acquired simultaneously, then separate detectors, can be used to collect the image from each of the coherent radiation sources.

According to one aspect of the disclosure, coherent radiation source 204a may produce first radiation beam 206a at one instance (i.e., a first instance) and coherent radiation source 204b may produce second radiation beam 206b at a different instance (i.e., a second instance where the second instance is different in time from the first instance). Similarly, in another aspect of the disclosure, aperture 202 may collect first return beam 210a at one instance and second return beam 210b at a different instance. In yet another aspect, detector 220 may detect the interference between first return beam 210a and first reference beam 212a to form the first interferogram at one instance, and detector 220 may also detect the interference between second return beam 210b and second reference beam 212b to form the second interferogram at a different instance.

Figure 3:
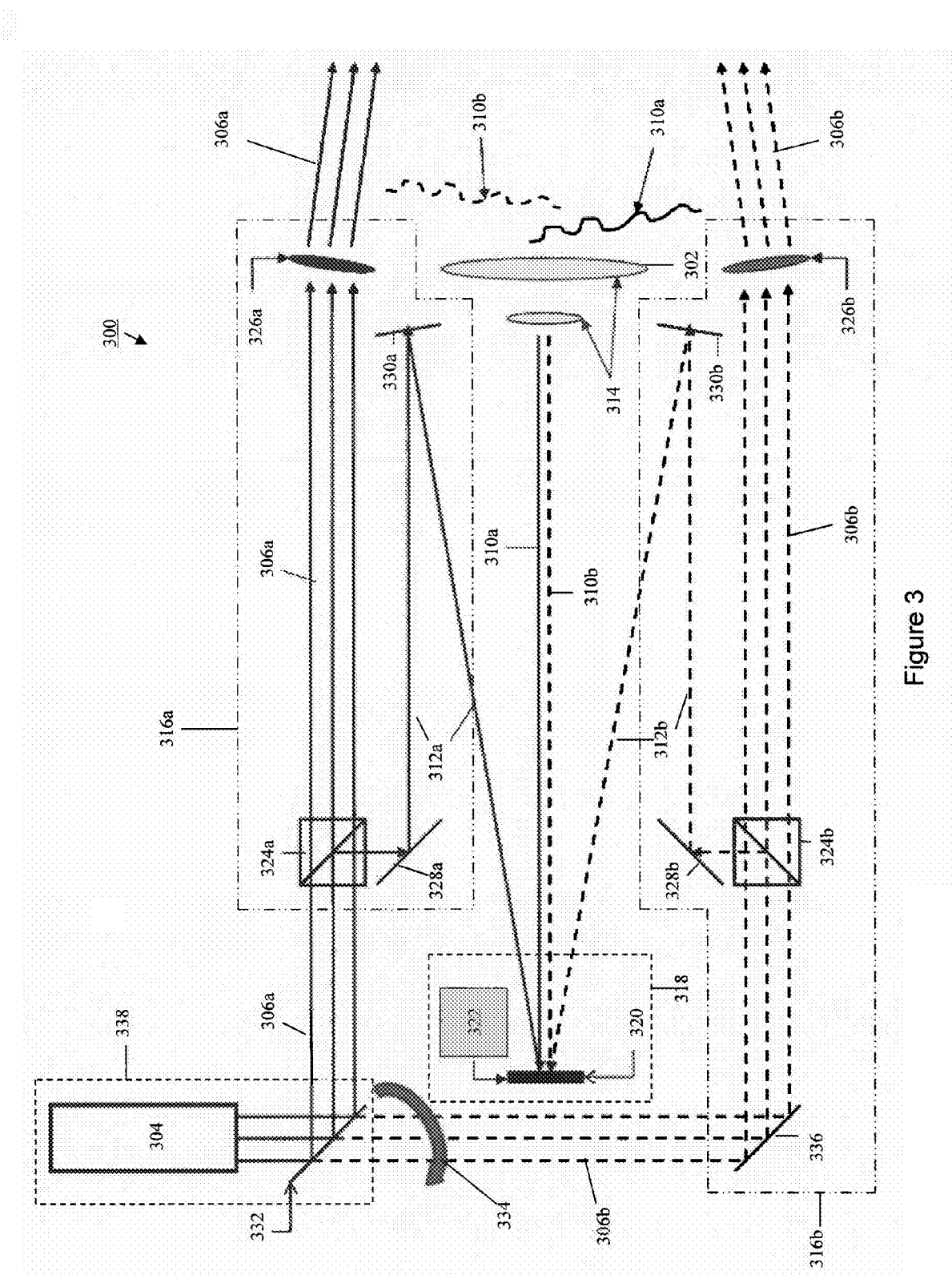
FIG. 3 illustrates an example of a configuration for a coherent imaging system, in accordance with one aspect of the subject technology.

FIG. 3 illustrates an example of a configuration for a coherent imaging system 300, in accordance with one aspect of the subject technology. A single coherent radiation source may be used with a flip mirror to illuminate a target from different directions.

In another aspect of the subject technology, it is possible to use one coherent radiation source and a single aperture to achieve the same effect as the coherent imaging system of FIG. 1B or coherent imaging system 200, which may use multiple coherent radiation sources and a single aperture. In one aspect, a single coherent radiation source can be moved so that a target can be illuminated from different angles. In another aspect, the radiation beam illuminating the target can be adjusted using various optical components to illuminate the target at different angles. According to one aspect of the disclosure, high resolution coherent images can be obtained by combining separate coherent images of objects illuminated at different times from different angles using a single coherent radiation source and a single aperture.

Referring to FIG. 3, coherent radiation source module 338 may comprise coherent radiation source 304 and flip mirror 332. Coherent radiation source 304 may produce first radiation beam 306a to illuminate a target (not shown). Flip mirror 332 can be used to redirect the radiation beams generated by coherent radiation source 304 to different transmitting optics that illuminates the target from different angles. For example, flip mirror 332, in a first position, may direct first radiation beam 306a towards first optical component 316a. First optical component 316a may direct first radiation beam 306a towards the target at a first angle to produce a first return beam 310a. First optical component 316a may also produce first reference beam 312a. First optical component 316a may comprise various optical components such as beamsplitters, beamcombiners, mirrors, polarizers, wave plates, lenses, fiber splitters, or other optical components, which may be utilized in various configurations known to those of skill in the art to route and direct radiation beams. For example, according to one aspect of the disclosure, first optical component 316a may comprise a first beamsplitter 324a configured to direct first radiation beam 306a towards first transmitter 326a, such as a lens or telescope. First transmitter 326a may direct first radiation beam 306a towards the target at the first angle. First mirrors 328a and 330a may direct first reference beam 312a towards detector 320. Detector module 318 may comprise detector 320 and processor 322.

Aperture 302 may capture the return speckle field from the target. For example, aperture 302 may collect first return beam 310a. An optional pupil and beam reduction optics 314 (i.e., beam magnification optics) may be used for afocal magnification. For example, pupil and beam reduction optics 314 may be used for de-magnifying first return beam 310a.

According to one aspect of the disclosure, after first return beam 310a is de-magnified, it is sent to the focal plane of detector 320. For example, first return beam 310a is directed towards detector 320 and interfered or mixed with first reference beam 312a, forming a first inteferogram. The resulting inteferogram may be detected by detector 320. Detector 320 may be a conventional CCD, a CMOS detector, or any other suitable imaging device. Detector 320 may output the detected signals, such as the first interferogram, to processor 322, where digital processing produces a Fourier transform pair of the field at the target and the pupil, in accordance with one aspect of the disclosure. For example, processor 322 can determine the Fourier transform of the first interferogram to produce a first coherent image.

After collection of the image from first radiation beam 306a, another image may be captured by producing a second radiation beam 306b to illuminate the target at a different angle. For example, coherent radiation source 304 may produce second radiation beam 306b. Flip mirror 332, in a second position (as indicated by arrow 334), may direct second radiation beam 306b towards second optical component 316b.

Second optical component 316b may direct second radiation beam 306b towards the target at a second angle to produce a second return beam 310b. Second optical component 316b may also produce second reference beam 312b. Second optical component 316b may comprise various optical components such as beamsplitters, beamcombiners, mirrors, polarizers, wave plates, lenses, fiber splitters, or other optical components, which may be utilized in various configurations known to those of skill in the art to route and direct radiation beams. For example, according to one aspect of the disclosure, second optical component 316b may comprise a mirror 336 to direct second radiation beam 306b towards a second beamsplitter 324b, which may be configured to direct second radiation beam 306b towards second transmitter 326b, such as a lens or telescope. Second transmitter 326b may direct second radiation beam 306b towards the target at the second angle. Second mirrors 328b and 330b may direct second reference beam 312b towards detector 320.

Aperture 302 may again capture the return speckle field from the target. For example, aperture 302 may collect second return beam 310b. Note that a different region of the speckle field is collected, in accordance with one aspect of the disclosure. Optional pupil and beam reduction optics 314 may be used for afocal magnification. For example, pupil and beam reduction optics 314 may be used for de-magnifying second return beam 310b.

According to one aspect of the disclosure, after second return beam 310b is de-magnified, it is sent to the focal plane of detector 320. For example, second return beam 310b is directed towards detector 320 and interfered or mixed with second reference beam 312b, forming a second inteferogram. The resulting inteferogram may be detected by detector 320. Detector 320 may output the detected signals, such as the second interferogram, to processor 322, where digital processing produces a Fourier transform pair of the field at the target and the pupil, in accordance with one aspect of the disclosure. For example, processor 322 can determine the Fourier transform of the second interferogram to produce a second coherent image.

In one aspect, the resulting second coherent image has the same resolution as the first coherent image. However, if the coherent images of the pupil are digitally reassembled to create an image of a larger distributed aperture pupil, then the resulting Fourier transform performed by processor 322 may produce a high resolution coherent image, where the high resolution coherent image has a resolution higher than a resolution of the first coherent image or the second coherent image. According to one aspect of the disclosure, if the image from each radiation beam needs to be acquired simultaneously, then separate detectors, can be used to collect the image from each of the coherent radiation sources.

According to one aspect of the disclosure, coherent radiation source 304 may produce first radiation beam 306a at one instance (i.e., a first instance) and second radiation beam 306b at a different instance (i.e., a second instance where the second instance is different in time from the first instance). Similarly, in another aspect of the disclosure, aperture 302 may collect first return beam 310a at one instance and second return beam 310b at a different instance. In yet another aspect, detector 320 may detect the interference between first return beam 310a and first reference beam 312a to form the first interferogram at one instance, and detector 320 may also detect the interference between second return beam 310b and second reference beam 312b to form the second interferogram at a different instance.

According to one approach, three dimensional images of the target can be obtained by collecting and processing images at two or more wavelengths. This can be done by using tunable lasers. For example, coherent radiation sources 204a or 204b of FIG. 2, or coherent radiation source 304 of FIG. 3 may comprise tunable lasers, according to one aspect of the disclosure. While this method may not improve the longitudinal (height) resolution, it may improve the lateral resolution, in accordance with one aspect of the disclosure. For example, a lateral resolution of the high resolution coherent image can be higher than a lateral resolution of the first coherent image or the second coherent image.

FIGS. 4A, 4B, 4C and 4D illustrate an example of coherent imaging processing, according to one approach. For example, FIGS. 4A, 4B, 4C and 4D present simulated processing required to extract the complex pupil image from a single coherent pupil image.

The coherent images, for example the first coherent images and the second coherent images produced by processor 222 of FIG. 2 or processor 322 of FIG. 3, may need to be digitally processed in order to create a high resolution coherent image. According to one approach, a coherent image can be extracted from the detector data from a single radiation beam.

Figure 4A:
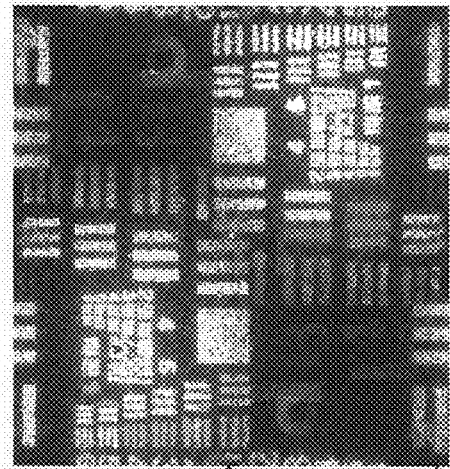
FIGS. 4A, 4B, 4C and 4D illustrate an example of coherent imaging processing, according to one approach.
Figure 4C:
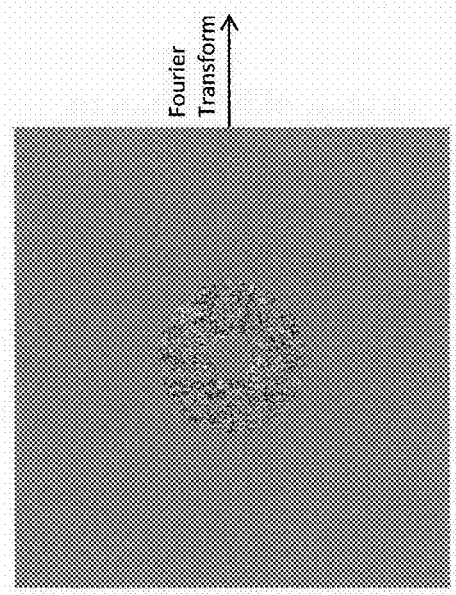
Figure 4B:
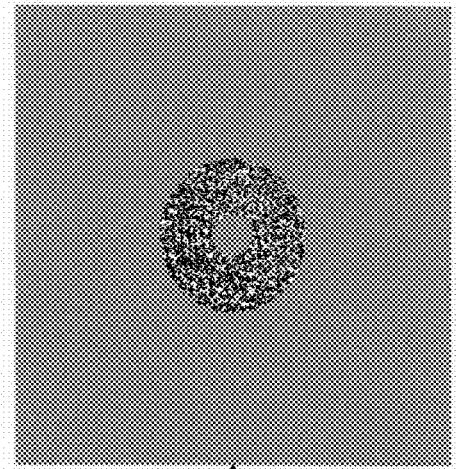
Figure 4D:
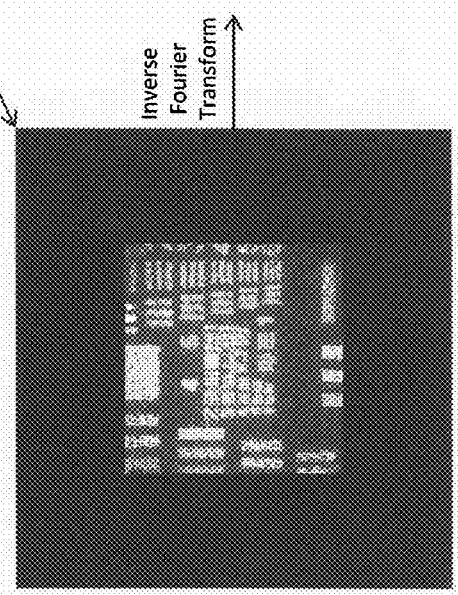

FIG. 4A illustrates an example of detector data, which may be the focal plane image (inteferogram). This detector data may be Fourier transformed to produce two coherent images of the target, shown in FIG. 4B. One of the coherent images may be masked and shifted to the center of the array, as shown in FIG. 4C. An inverse Fourier transform of the coherent image of FIG. 4C produces the complex pupil image, shown in FIG. 4D.

Figure 5B:
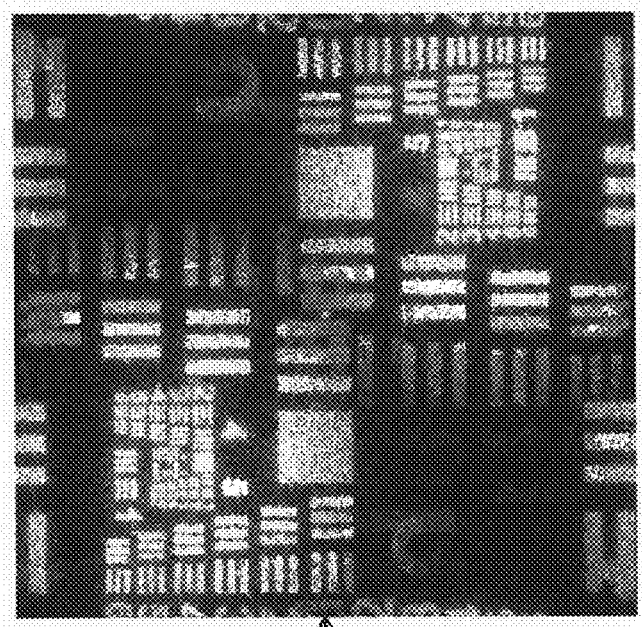
FIGS. 5A and 5B illustrate an example of high resolution coherent image processing, in accordance with one aspect of the subject technology.
Figure 5A:
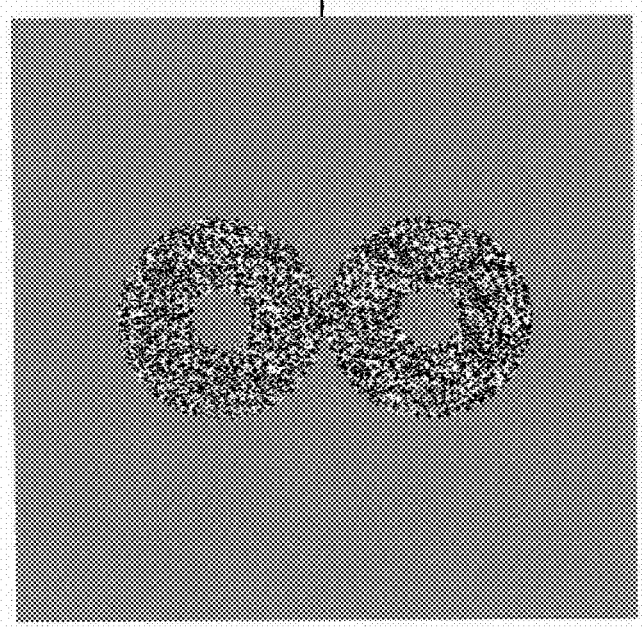

FIGS. 5A and 5B illustrate an example of high resolution coherent image processing, in accordance with one aspect of the subject technology.

According to one aspect of the subject technology, coherent images from the separate radiation beams can be combined to create a high resolution coherent image. To calculate a high resolution coherent image, a digital distributed aperture pupil image is created from the pupil image data from each radiation beam, in accordance with one aspect of the disclosure. For example, the individual pupil images may be digitally combined into a single array, as shown in FIG. 5A. The center of each pupil in the image corresponds to the center location for each coherent radiation source. In this simulated example, the digital distributed aperture complex pupil image is created from single aperture images with two separate coherent radiation sources. Each of the coherent radiation sources are off-axis in the vertical direction by a distance equal to the radius of the collecting aperture. The combined pupil map may be Fourier transformed to produce the high resolution coherent image, shown in FIG. 5B.

According to one approach, coherent 3D imaging can be used for industrial inspection and manufacturing quality control. In accordance with one aspect of the disclosure, the subject technology can be used to improve the resolution of those images.

Figure 6:
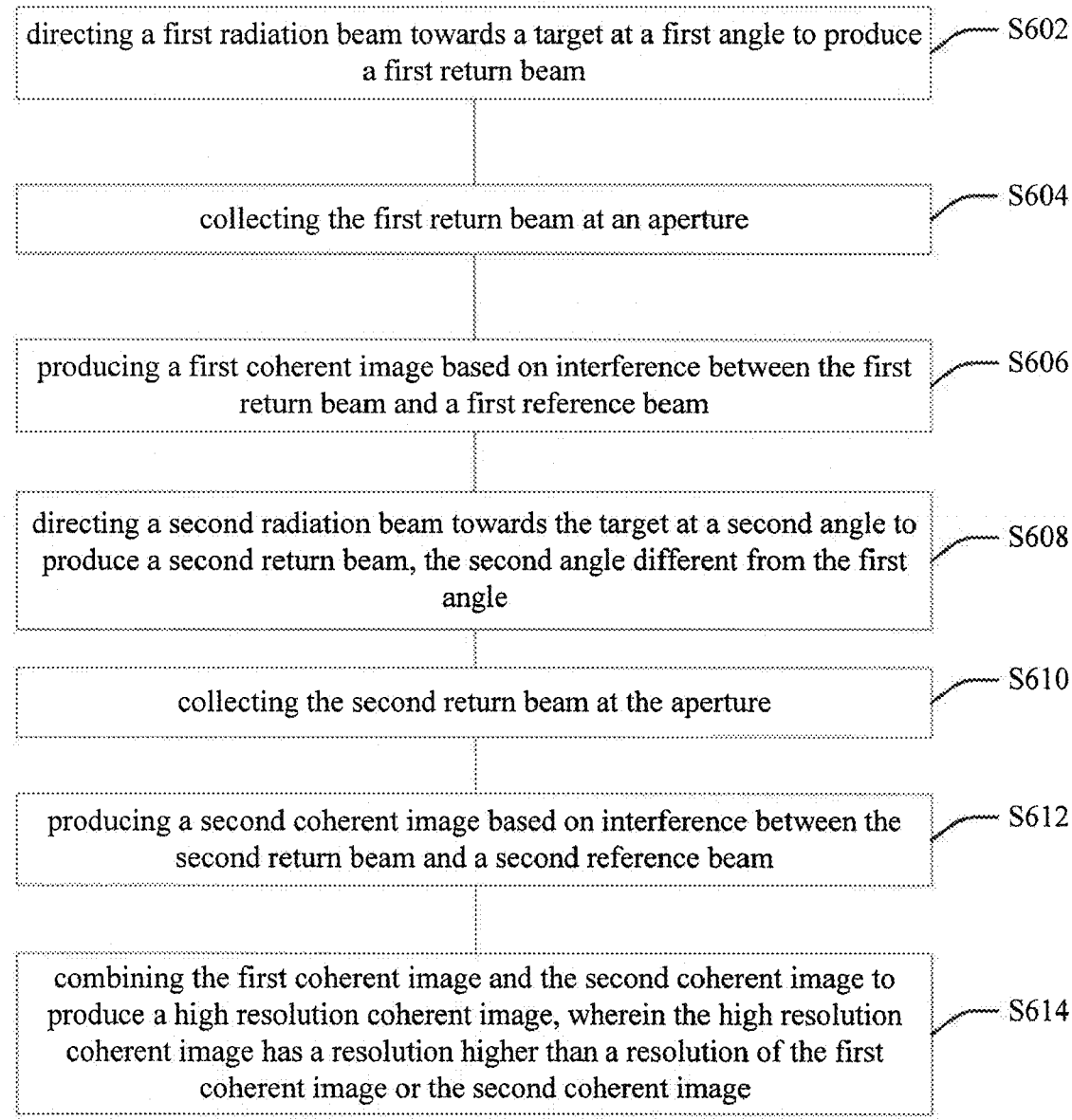
FIG. 6 illustrates an example of a method for producing high resolution coherent images, in accordance with one aspect of the subject technology.

FIG. 6 illustrates an example of a method S600 for producing high resolution coherent images, in accordance with one aspect of the subject technology.

In accordance with one aspect of the disclosure, method S600 comprises directing a first radiation beam towards a target at a first angle to produce a first return beam (S602) and collecting the first return beam at an aperture (S604). Method S600 also comprises producing a first coherent image based on interference between the first return beam and a first reference beam (S606). Method S600 also comprises directing a second radiation beam towards the target at a second angle to produce a second return beam, the second angle different from the first angle (S608). Method S600 also comprises collecting the second return beam at the aperture (S610) and producing a second coherent image based on interference between the second return beam and a second reference beam (S612). Method S600 also comprises combining the first coherent image and the second coherent image to produce a high resolution coherent image, wherein the high resolution coherent image has a resolution higher than a resolution of the first coherent image or the second coherent image (S614).

Figure 7:
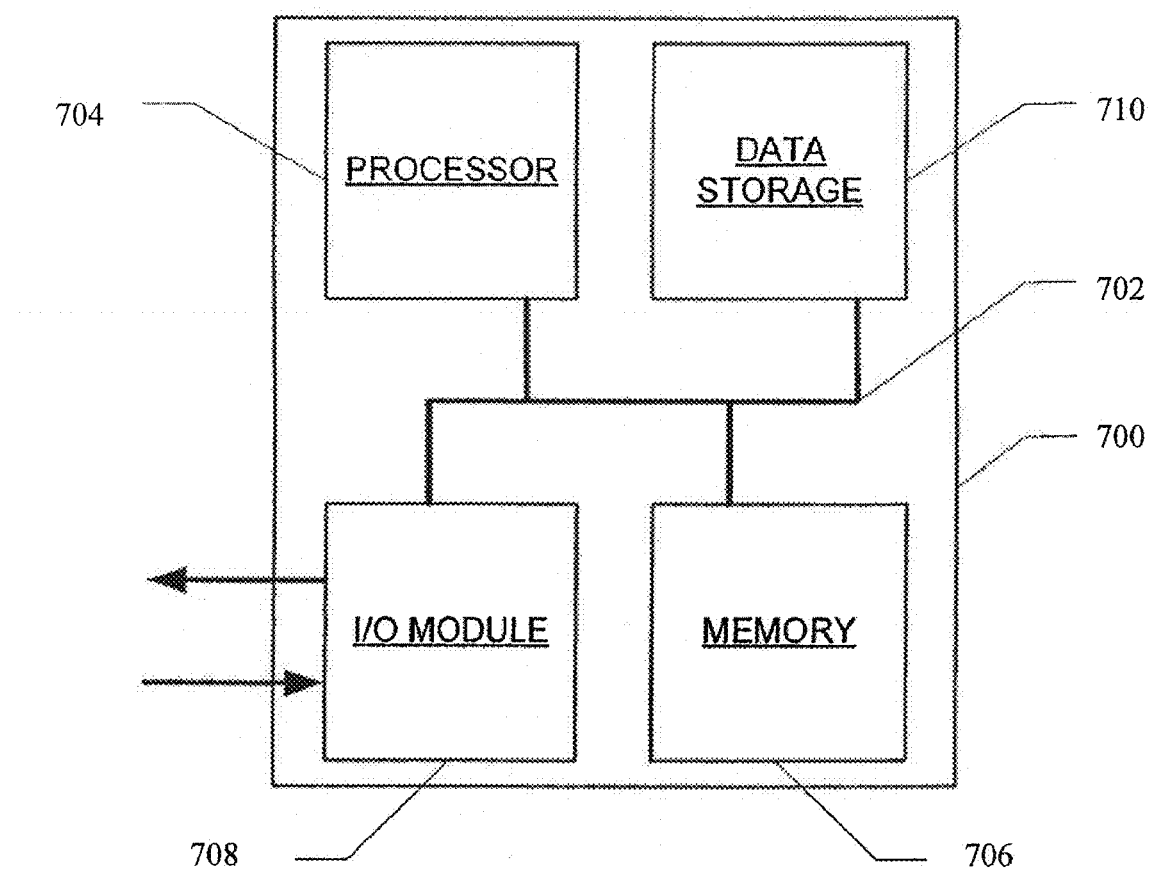
FIG. 7 is a block diagram illustrating an example of a computer system, in accordance with one aspect of the subject technology

FIG. 7 is a block diagram illustrating an example of a computer system, in accordance with one aspect of the subject technology. In one aspect, a computer system 700 may be utilized to implement an embodiment of the subject technology. Computer system 700 includes a bus 702 or other communication mechanism for communicating information, and a processor 704 coupled with bus 702 for processing information. Computer system 700 also includes a memory 706, such as a random access memory ("RAM") or other dynamic storage device, coupled to bus 702 for storing information and instructions to be executed by processor 704. Memory 706 may also be used for storing temporary variables or other intermediate information during execution of instructions by processor 704. Computer system 700 further includes a data storage device 710, such as a magnetic disk or optical disk, coupled to bus 702 for storing information and instructions.

Computer system 700 may be coupled via I/O module 708 to a display device (not illustrated), such as a cathode ray tube ("CRT") or liquid crystal display ("LCD") for displaying information to a computer user. An input device, such as, for example, a keyboard or a mouse may also be coupled to computer system 700 via I/O module 708 for communicating information and command selections to processor 704. In one aspect, processor 222 of FIG. 2 or processor 322 of FIG. 3 may be represented by computer system 700. In another aspect, processor 222 of FIG. 2 or processor 322 of FIG. 3 may be represented by processor 704.

According to one embodiment of the subject technology, high resolution coherent image processing is performed by a computer system 700 in response to processor 704 executing one or more sequences of one or more instructions contained in memory 706. Such instructions may be read into memory 706 from another machine-readable medium, such as data storage device 710. Execution of the sequences of instructions contained in main memory 706 causes processor 704 to perform the process steps described herein. One or more processors in a multi-processing arrangement may also be employed to execute the sequences of instructions contained in memory 706. In alternative embodiments, hard-wired circuitry may be used in place of or in combination with software instructions to implement various embodiments of the subject technology. Thus, embodiments of the subject technology are not limited to any specific combination of hardware circuitry and software.

The term "machine-readable medium" as used herein refers to any medium that participates in providing instructions to processor 704 for execution. Such a medium may take many forms, including, but not limited to, non-volatile media, volatile media, and transmission media. Non-volatile media include, for example, optical or magnetic disks, such as data storage device 710. Volatile media include dynamic memory, such as memory 706. Transmission media include coaxial cables, copper wire, and fiber optics, including the wires that comprise bus 702. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The word "exemplary" is used herein to mean "serving as an example, instance, or illustration." Any embodiment described herein as "exemplary" is not necessarily to be construed as preferred or advantageous over other embodiments.

The description of the invention is provided to enable any person skilled in the art to practice the various configurations described herein. While the subject technology has been particularly described with reference to the various figures and configurations, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these configurations will be readily apparent to those skilled in the art, and generic principles defined herein may be applied to other configurations. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A coherent imaging system for producing high resolution images, comprising:
   a coherent radiation source module configured to produce a first radiation beam at a first instance and a second radiation beam at a second instance, the second instance different in time from the first instance;
   a first optical component configured to direct the first radiation beam towards a target at a first angle to produce a first return beam, and configured to produce a first reference beam;
   a second optical component configured to direct the second radiation beam towards the target at a second angle to produce a second return beam, and configured to produce a second reference beam, the second angle different from the first angle;
   an aperture configured to collect the first return beam and the second return beam; and
   a detector module configured to produce a first coherent image based on interference between the first return beam and the first reference beam, configured to produce a second coherent image based on interference between the second return beam and the second reference beam, and configured to combine the first coherent image and the second coherent image to produce a high resolution coherent image, wherein the high resolution coherent image has a resolution higher than a resolution of the first coherent image or the second coherent image.

2. The coherent imaging system of claim 1, wherein the detector module comprises:
a detector configured to detect the interference between the first return beam and the first reference beam to form a first interferogram, and configured to detect the interference between the second return beam and the second reference beam to form a second interferogram; and
a processor configured to determine a Fourier transform of the first interferogram to produce the first coherent image, and configured to determine a Fourier transform of the second interferogram to produce the second coherent image.

3. The coherent imaging system of claim 1, wherein the aperture is further configured to collect the first return beam at one instance and the second return beam at a different instance.

4. The coherent imaging system of claim 1,
wherein the first optical component comprises:
a first beamsplitter configured to direct the first radiation beam towards a first transmitter, the first beamsplitter further configured to produce the first reference beam;
the first transmitter configured to direct the first radiation beam towards the target at the first angle to produce the first return beam; and
a first mirror configured to direct the first reference beam towards the detector module, and
wherein the second optical component comprises:
a second beamsplitter configured to direct the second radiation beam towards a second transmitter, the second beamsplitter further configured to produce the second reference beam;
the second transmitter configured to direct the second radiation beam towards the target at the second angle to produce the second return beam; and
a second mirror configured to direct the second reference beam towards the detector module.

5. The coherent imaging system of claim 1, wherein the coherent radiation source module comprises a laser source and a flip mirror, the laser source configured to produce the first radiation beam, the flip mirror in a first position configured to direct the first radiation beam towards the first optical component, the laser source configured to produce the second radiation beam, the flip mirror in a second position configured to direct the second radiation beam towards the second optical component, wherein the first position is different from the second position.

6. The coherent imaging system of claim 1, wherein the coherent radiation source module comprises a first laser source and a second laser source, the first laser source configured to produce the first radiation beam, the second laser source configured to produce the second radiation beam, wherein each of the first laser source and the second laser source is a tunable laser.

7. The coherent imaging system of claim 1, wherein a spacecraft comprises the coherent imaging system and wherein the coherent radiation source module is stowable and deployable in the spacecraft.

8. A coherent imaging system for producing high resolution images, comprising:
a coherent radiation source module configured to produce a first radiation beam and a second radiation beam;
an optical component configured to direct the first radiation beam towards a target at a first angle to produce a first return beam, the optical component further configured to produce a first reference beam, the optical component further configured to direct the second radiation beam towards the target at a second angle to produce a second return beam, the optical component further configured to produce a second reference beam;
an aperture configured to collect the first return beam and the second return beam; and
a detector module configured to produce a first coherent image based on interference between the first return beam and the first reference beam, configured to produce a second coherent image based on interference between the second return beam and the second reference beam, and configured to combine the first coherent image and the second coherent image to produce a high resolution coherent image, wherein the high resolution coherent image has a resolution higher than a resolution of the first coherent image or the second coherent image.

9. The coherent imaging system of claim 8, wherein the detector module comprises:
a detector configured to detect the interference between the first return beam and the first reference beam to form a first interferogram, and configured to detect the interference between the second return beam and the second reference beam to form a second interferogram; and
a processor configured to determine a Fourier transform of the first interferogram to produce the first coherent image, and configured to determine a Fourier transform of the second interferogram to produce the second coherent image.

10. The coherent imaging system of claim 8, wherein the coherent radiation source module is further configured to produce the first radiation beam at a first instance and the second radiation beam at a second instance, the second instance different in time from the first instance.

11. The coherent imaging system of claim 8, wherein the aperture is further configured to collect the first return beam at a first instance and the second return beam at a second instance, the second instance different in time from the first instance.

12. The coherent imaging system of claim 8, wherein the optical component comprises:
a first optical component comprising:
a first beamsplitter configured to direct the first radiation beam towards a first transmitter, the first beamsplitter further configured to produce the first reference beam;
the first transmitter configured to direct the first radiation beam towards the target at the first angle to produce the first return beam; and
a first mirror configured to direct the first reference beam towards the detector module; and
a second optical component comprising:
a second beamsplitter configured to direct the second radiation beam towards a second transmitter, the second beamsplitter further configured to produce the second reference beam;
the second transmitter configured to direct the second radiation beam towards the target at the second angle to produce the second return beam; and
a second mirror configured to direct the second reference beam towards the detector module.

13. The coherent imaging system of claim 8, wherein the optical component comprises a first optical component and a second optical component, and wherein the coherent radiation source module comprises a laser source and a flip mirror, the laser source configured to produce the first radiation beam, the flip mirror in a first position configured to direct the first radiation beam towards the first optical component, the laser source configured to produce the second radiation beam, the flip mirror in a second position configured to direct the second radiation beam towards the second optical component, wherein the first position is different from the second position.

14. The coherent imaging system of claim 8, wherein the coherent radiation source module comprises a first laser source and a second laser source, the first laser source configured to produce the first radiation beam, the second laser source configured to produce the second radiation beam, wherein each of the first laser source and the second laser source is a tunable laser.

15. The coherent imaging system of claim 8, wherein a spacecraft comprises the coherent imaging system and wherein the coherent radiation source module is stowable and deployable in the spacecraft.

16. A method for producing high resolution images, comprising:
    directing a first radiation beam towards a target at a first angle to produce a first return beam;
    collecting the first return beam at an aperture;
    producing a first coherent image based on interference between the first return beam and a first reference beam;
    directing a second radiation beam towards the target at a second angle to produce a second return beam, the second angle different from the first angle;
    collecting the second return beam at the aperture;
    producing a second coherent image based on interference between the second return beam and a second reference beam; and
    combining the first coherent image and the second coherent image to produce a high resolution coherent image, wherein the high resolution coherent image has a resolution higher than a resolution of the first coherent image or the second coherent image.

17. The method of claim 16, further comprising:
    producing the first radiation beam at a first instance; and
    producing the second radiation beam at a second instance, the second instance different in time from the first instance.

18. The method of claim 16,
    wherein the producing a first coherent image comprises:
        detecting interference between the first return beam and the first reference beam to form a first interferogram; and
        determining a Fourier transform of the first interferogram to produce the first coherent image, and
    wherein the producing the second coherent image comprises:
        detecting interference between the second return beam and the second reference beam to form a second interferogram; and
        determining a Fourier transform of the second interferogram to produce the second coherent image.

19. The method of claim 16, wherein the collecting the first return beam comprises collecting the first return beam at a first instance, and wherein the collecting the second return beam comprises collecting the second return beam at a second instance, the second instance different in time from the first instance.

20. The method of claim 16, wherein the combining the first coherent image and the second coherent image to produce a high resolution coherent image comprises:
    determining an inverse Fourier transform of the first coherent image to produce a first complex pupil image;
    determining an inverse Fourier transform of the second coherent image to produce a second complex pupil image;
    combining the first complex pupil image and the second complex pupil image to form a digital distributed aperture pupil image; and
    determining a Fourier transform of the digital distributed aperture pupil image to produce the high resolution coherent image.

* * * * *